United States Patent [19]

Kubota

[11] Patent Number: 4,803,561
[45] Date of Patent: Feb. 7, 1989

[54] IMAGE READING METHOD AND APPARATUS

[75] Inventor: Jun Kubota, Kanagawa, Japan

[73] Assignee: Fuji Photo Film Co., Ltd., Kanagawa, Japan

[21] Appl. No.: 3,008

[22] Filed: Jan. 13, 1987

[30] Foreign Application Priority Data

Jan. 13, 1986 [JP] Japan ............................ 61-4851

[51] Int. Cl.$^4$ ............................................. H04N 1/04
[52] U.S. Cl. ..................................... 358/285; 358/293
[58] Field of Search ............... 358/293, 283, 294, 285, 358/256; 250/578

[56] References Cited

U.S. PATENT DOCUMENTS

| | | | |
|---|---|---|---|
| 4,409,625 | 10/1983 | Ogasawara | 358/288 |
| 4,471,386 | 9/1984 | Tuhro | 358/288 |
| 4,620,233 | 8/1986 | Ogawa et al. | 358/293 |
| 4,705,958 | 11/1987 | Sugita | 358/293 |
| 4,743,976 | 5/1988 | Katakabe | 358/285 |

Primary Examiner—James J. Groody
Assistant Examiner—Jerome Grant, II
Attorney, Agent, or Firm—Sughrue, Mion, Zinn, Macpeak, and Seas

[57] ABSTRACT

An image reading method and apparatus utilizing a movable line sensor in which reading conditions for a first image are set, and then the reading of the first image is performed in a first direction. Subsequently, the first image is replaced with a second image and the second image is scanned in a second direction opposite to the first direction. During the scanning of the second image the reading conditions for the second image are calculated and set.

7 Claims, 7 Drawing Sheets

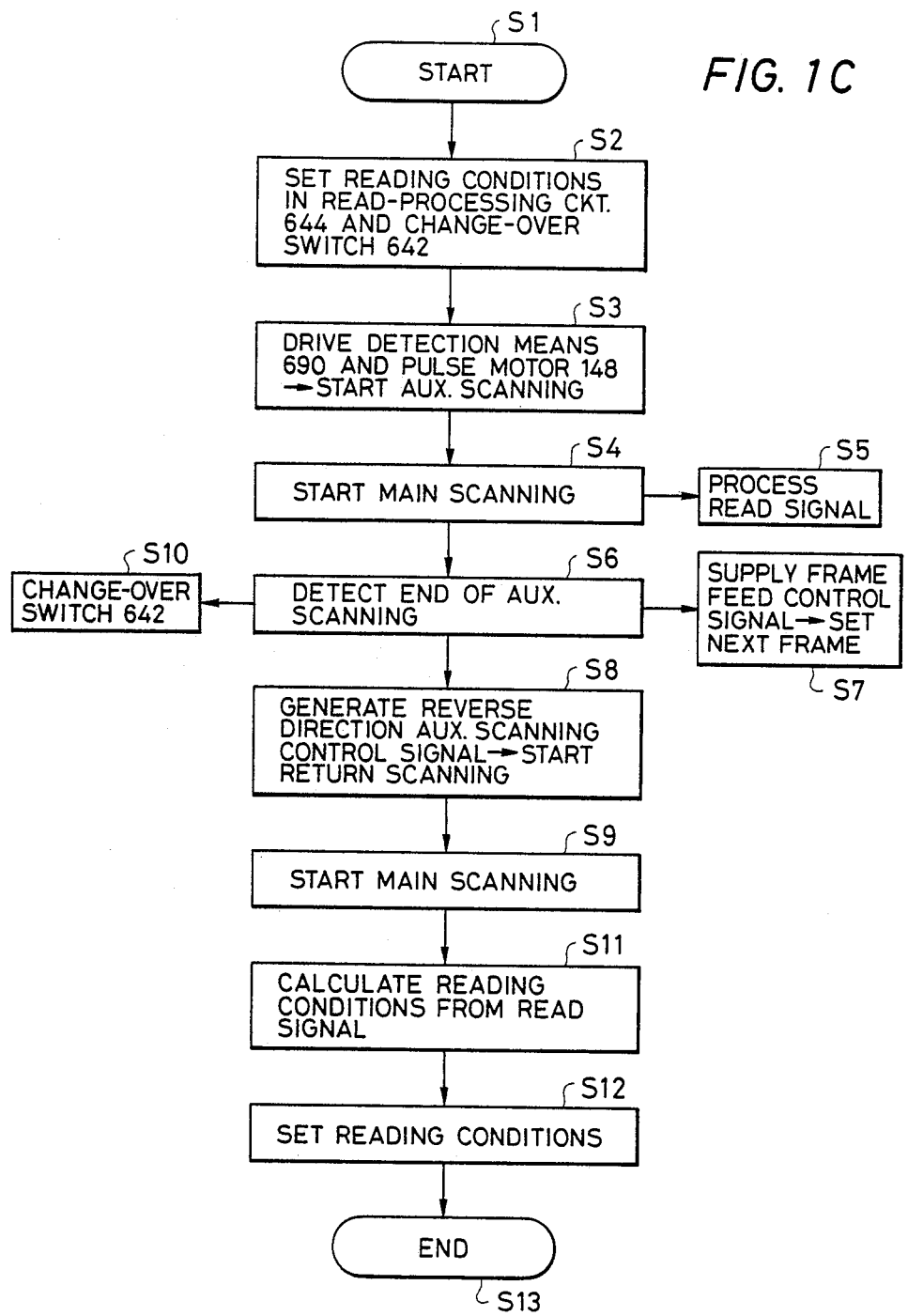

IMAGE READING METHOD AND APPARATUS

BACKGROUND OF THE INVENTION

1. Field of the Invention

The present invention relates to a method of reading an image. It particularly relates to a method of preparatory scanning by a one-dimensional image sensor for reading a two-dimensional image such as the original image on a film, paper or the like.

2. Background of the Invention

There are known copying machines, a facsimile apparatus and so forth which are used as conventional image readers. A microfilm reader has recently been developed for an image processing system, to which it is preferable to apply the present invention.

The number of originals, in which various pieces of information are recorded, has been sharply increasing along with the general increase in the quantity of information these days. A system is strongly required nowadays in which a large number of such originals are stored in a compact space and can be easily retrieved. In order to meet the requirement, the information recorded in each of the originals needs to be compressed and then recorded by some means for storage. A microfilm, an optical disk or the like is used as the storage means. On the microfilm, two-dimensional visible information is recorded. Microfilm has advantages in that it can be preserved for a long period of time and can be used as legal evidence. Also, the same information can be copied a large number of times. The optical disk has advantages that a large quantity of information can be recorded therein, the addition or renewal of information can be performed on a real-time basis, and information recorded in the disk can be directly utilized for communication through the connection of the disk to a computer because the information is digitally recorded in the disk.

In order to make the most of the advantages of both the micro-film and the optical disk, it has been proposed that originals on paper or the like are sequentially photographed on the microfilm, and the information thus recorded on the microfilm and retrieval information for enabling future retrieval are recorded together on the optical disk. If the information on the originals and the retrieval information are thus recorded together in the optical disk, anyone can take out the recorded information, print it out, copy it on another microfilm or directly transmit it to a remote place through a facsimile system, when necessary, thus enabling the efficient utilization of the information.

FIGS. 2, 3 and 4 show block diagrams for describing an example of a microfilm reader for an image processing system which has been proposed for the purpose of writing information from an original into an optical disk. The microfilm reader is hereafter outlined with reference to FIG. 2. First, information on an original such as a character and a drawing or digital image information recorded in a computer memory is recorded on a microfilm. Then, only a desired piece of the information recorded on the microfilm is read by a microfilm scanner so that the read information is stored in the optical disk. For example, image information on the original 10, such as paper or the like, is photographed on the microfilm 40 by a microfilm photographing unit 20 (hereinafter simply referred to as camera). Conventional development 30 is then performed on the microfilm, as shown in FIG. 2. The microfilm 40 can be a 16-mm roll of microfilm 42, a 35-mm roll of microfilm 44, a microfiche 46, an aperture film 48 or the like. The image information recorded on the microfilm 40 is read by the microfilm scanner 100 so that the information is converted into digital image information PS. The information PS and control information, which is used for causing correspondence to the order of photographing of the photographed images, are sent to an optical disk recorder 200 in which the image information PS and the control information are stored on an optical disk 50. In order to read the information PS, the microfilm 40 is loaded in an exclusively used holder 102 and set in a prescribed position so that the microfilm is scanned by an image scanner 104 and converted into a digital signal. The image on the microfilm 40 can be projected on a screen 106 to perform the digital conversion while, if necessary, the projected image is being watched. When the image information PS has been recorded in the optical disk 50 through the optical disk recorder 200, the image information PS inputted through the scanner 202, is read and the image is shown on a CRT display unit 204. Then index information for indicating the contents, kind or the like of the image is inputted through a keyboard 206 while the image shown on the display unit 204 is being watched. The inputted index information is written on the optical disk 50. Otherwise, the index information may be inputted through the keyboard 206 while the image projected on the screen 106 of the microfilm scanner 100 is being watched. Usually, such input work in done by a single operator. It takes 8 hours for him to process about 3,000 pages of originals. In order to increase the speed of the input work, a personal computer system 60 may be provided to do the work. In that case, a plurality of personal computers 62 and 64 are installed. The index information is inputted into one computer 62 through a keyboard 62a while the image projected on the screen 106 of the microfilm scanner 100 is being watched. An exclusively used microfilm reader 100a is provided for the other computer 64 to input the index information through a keyboard 64a while the image on the screen 106a of the microfilm reader 100 is being watched. Thereby, the information is written into both floppy disks 66 and 68. The floppy disks are put in the floppy disk section 70 of the optical disk recorder 200 to read data to write the index information onto the optical disk 50 correspondingly to the image information stored in the optical disk 50. It can be made possible that the index information created by the personal computers 62 and 64 are inputted into and outputted from the microfilm scanner 100. This techniques provides the scanner with a retrieval function to transfer to the optical disk recorder 200 the index information together with the image information and the control information.

The constitution of the microfilm scanner 100 is hereafter described with reference to FIG. 3. The microfilm scanner 100 comprises chiefly an optical reading section 120 for reading the image information on the microfilm, a section 140 for driving the optical reading section 120, a signal processing section 160 for supplying a read signal from the optical reading section 120 to the optical disk recorder 200, and a control section 180 for controlling the driving section 140 and the signal processing section 160.

The optical reading section 120 includes an illuminator 122 including a light source 1222 and a condensing lens 1224, a microfilm holder 124 which sandwiches the microfilm 40 between tight contact glasses 1242a and 1242b in order to prevent the image from being distorted. An image projector 126 in the optical reading section 120 includes a projecting lens 1262, focusing lenses 1264 and 1266, a half mirror 1268, which divides rays of light, and the screen 106. A feed reel 128a and a winding reel 128b move the microfilm 40 into an illuminating optical path. A mark sensor 130 optically detects a blip mark provided on the microfilm 40 or detects the difference in density between the frame and the space of the adjacent frames of the microfilm 40. An automatic exposure control sensor 132 detects the density of the microfilm 40 to read the image under optimum conditions. In a sensor unit 134, the optical image projected by the half mirror 1268 is scanned by the image sensor 104 so that the image is converted into an electric signal. If an image sensor is used which can read an image enlarged to the size of the original before the reduction of the image to a microscopic image, the focusing lenses 1264 and 1266 are not required.

The driving section 140 comprises a driving controller 144 for driving the feed reel 128a and the winding reel 128b depending on a signal from the mark sensor 130 to move the frames of the microfilm 40. In the driving section 140, a driving circuit 150 controls a motor 148 for driving a screw-nut mechanism mechanically coupled to the image sensor 104. As the motor 148 is rotated, the image sensor 104 can scan a surface around an optical axis.

The signal processing section 160 comprises a read-driving circuit 162, a resolution changeover circuit 164, and an RS422 data port 166. The read-driving circuit 162 functions to appropriately move the image sensor 104 to perform focusing, on the basis of the film density measured by the sensor 132, in order to read the image under the optimum conditions. The read-driving circuit 162 functions to supply the resolution changeover circuit 164 with the image information obtained by detecting the image through the image sensor 104 and by subjecting the image to photoelectric conversion. The resolution changeover circuit 164 sends out the image information at an optional line density such as 16 lines per millimeter and 8 lines per millimeter to an optical disk recorder 200 through the RS422 data port 166.

The controller 180 is a circuit for controlling the driving section 140 and the signal processing circuit 160, and comprises a central processing unit (hereinafter referred to as CPU) 182, an RS232C data port 184 for transmitting the control information, the image information and so forth between the CPU 182 and the optical disk recorder 200. It further comprises a personal computer 186 for transmitting a command to the CPU 182 through the RS232C data port 184. The controller 180 controls the driving controller 144 and the driving circuit 150 in accordance with an instruction from a keyboard 188 through an interface 190 which imparts another command to the CPU 182.

The constitution of the optical disk recorder 200 is hereafter described with reference to the block diagram of FIG. 4. The disk recorder 200 comprises a CPU 210, a read-only memory (ROM) 212, a random-access memory (RAM) 214, a cathode-ray tube (CRT) 216, a keyboard 218 and an interface 220, which are connected to a common bus 222. The interface 220 is also connected to a floppy disk unit 70 or a host-side CPU 224.

A graphic processor 228 performs the compilation, addition, elimination, enlargement or reduction of an image. The graphic processor 228, scanner 202 and the microfilm scanner 100 are connected to the CPU 224 by a bus 226.

A write or read controller 240, which controls the writing and reading into and from a floppy disk, and a driving section 260 are connected to the CPU 210, the ROM 212, the RAM 214, the CRT 216, the keyboard 218 and the interface 220 through an interface 230 and a bus 232. In the write or read controller 240, the writing of the image information and the reading of the stored image information are controlled by a disk data control section 242. The writing is performed by generating a laser beam LB from a laser driver 246 through the operation of a modulator 244. This operation depends on the image information, the control information and the index information and by the microfilm scanner 100 and the scanner 202.

Reading from the optical disk 50 is performed by a photo-cell 250 coupled to a reading head 248. Information optically picked up by the photo-cell 250 is transmitted through a photo-cell processor 252 and then demodulated by a demodulator 254. The reading head 248 is positioned by a focusing mechanism 256 to focus on the line of pits on the optical disk 50 to precisely read the information through the photo-cell 250.

The driving section 260 consists of a sector control system 262 and a cross feed control system 272. The sector control system is supervised by a sector controller 262. The cross feed control system is supervised by a cross feed controller 272. The sector controller 262 controls a spindle motor 266 through a driver 264. An actual controlled position is detected by a sector wheel 268 and a sector pulse counter 270. Data on the detected position is fed back to the sector controller 262 to control the spindle motor 266 to an instructed position for a sector. The cross feed controller 272 controls a linear motor 276 through a driver 274. The controlled position of the linear motor 276 is detected by a Moire fringe 278 and a grating 280. Data on the detected position is fed back to the cross feed controller 272 to control the linear motor 276 to an instructed for cross feed.

If the above-described microfilm reader is used, not only existing information provided on a microfilm but also other information not provided on the microfilm but appropriate to be recorded in the optical disk can be provided on another microfilm and stored, and the stored information can be retrieved and utilized in an on-line manner. In the microfilm reader, as shown in FIG. 5, the microfilm 40, which is projected on an exposure table 1342 by illuminating light from the light source 1222, is scanned by the linear image sensor 104 in a main scanning direction X along the array of the sensor and in an auxiliary scanning direction Y in which the sensor is mechanically driven. Each element of the linear image sensor 104 at each scanning position constitutes an image element matrix along the two dimensions X and Y. As a result, an image signal is obtained from the sensor 104 in a time-serial manner for each image element and converted into a binary signal which is outputted for later processing. The main scanning action of the one-dimensional image sensor 104 is electrically performed only in a forward direction through the read-driving circuit. The auxiliary scanning action of the sensor and its return scanning action to a reading start position performed through the mechanical reciprocating action of an auxiliary scanning mechanism.

FIG. 6 shows a schematic view of the auxiliary scanning mechanism of the microfilm reader. Differently from the screw-nut mechanism 146 shown in FIG. 3, the rotative power of the pulse motor 148 is transmitted by pulleys in the auxiliary scanning mechanism to reciprocate the image sensor 104. The rotary motion of the driving shaft of the pulse motor 148 is transmitted to a pulley 624 through a pulley 620 and a belt 622, and then transmitted to cables 630a and 630b or the like wound on pulleys 628a and 628b, through the shaft 626 of the pulley 624 and the pulleys 628a and 628b provided at both the ends of the shaft 626. An auxiliary scanning support 632 is coupled to the cables 630a and 630b. The linear image sensor 104 is secured to the auxiliary scanning support 632. One end of the support 632 is movably attached to a fixed guide 636a through a movable guide 634, while the other end of the support 632 is movable on another fixed guide 636b. In the auxiliary scanning mechanism, the pulse motor 148 can be rotated forward (in an auxiliary scanning direction) or backward (in a return scanning direction) to cause the image sensor 104 to perform the scanning. A driving circuit 150, as shown in FIGS. 3 and 7, for driving the pulse motor 148 includes a section 150a for driving the motor and a pulse generator 150b for supplying the driving section with pulses for controlling the driving.

As shown in FIG. 8, when each single image 300 is to be read by the linear image sensor 104, the sensor 104 is mechanically drive in the auxiliary scanning direction to perform preparatory scanning simultaneously with the electric scanning in the main scanning direction. The sensor 104 is thereafter returned from a preparatory scanning end position Q to the read-scanning start position P. The preparatory scanning measured reading conditions such as the density of the image and its contrast. Under the reading conditions measured by the preparatory scanning, the image sensor 104 is caused to perform major scanning to read the image. The image sensor 104 is thereafter returned from the scanning end position Q to the scanning start position P. For that reason, in such a conventional image reading method, the image sensor is reciprocated twice, the first time for the preparatory scanning and the second time for the major scanning. Therefore, it is time-consuming to read each single image. Because of the double reciprocation of the image sensor to read each single image, the frequency of operation of the auxiliary scanning mechanism is so high that its life is shortened. Since a means for quickly returning the image sensor is needed, the circuit constitution of the auxiliary scanning mechanism is complicated and expensive.

SUMMARY OF THE INVENTION

The present invention was made in consideration of the above-mentioned problems. Accordingly, it is an object of the present invention to provide an image reading method in which an image sensor is driven not only to read an image by auxiliary scanning but also to perform preparatory scanning for reading a next image.

The image reading method of the invention is characterized in that the preparatory scanning for measuring the reading conditions of the next image is performed while the image sensor is returned after the auxiliary scanning for reading the preceding image is performed. For that reason, the image sensor needs to be reciprocated only once in the direction of the auxiliary scanning in order to read each single image. Therefore, it is made less time-consuming to read the image, and the frequency of operation of an auxiliary scanning mechanism is decreased to a half of that of a conventional auxiliary scanning mechanism so as to lengthen the life of the mechanism according to the present invention. Since the preparatory scanning is performed while the image sensor is returned, the sensor does not need to be quickly returned. Therefore, a quick return circuit is not needed, so that a circuit constitution according to the present invention is made simple an less expensive.

BRIEF DESCRIPTION OF THE DRAWINGS

FIGS. 1A, 1B and 1C are drawings for explaining an image reading method provided according to the present invention;

DETAILED DESCRIPTION OF THE PREFERRED EMBODIMENT

An embodiment of the present invention, which is an image reading method, is hereafter described with reference to the drawings. In the embodiment, a projected image made on an exposure table by projecting a negative microfilm thereon is read by a one-dimensional image sensor.

Figure 1A:
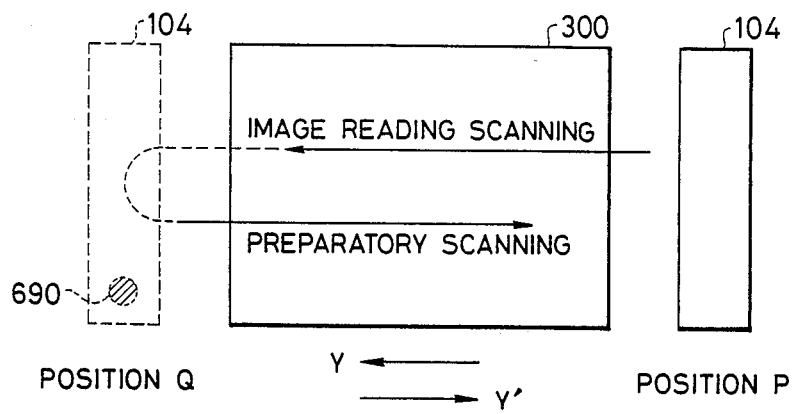
Figure 1B:
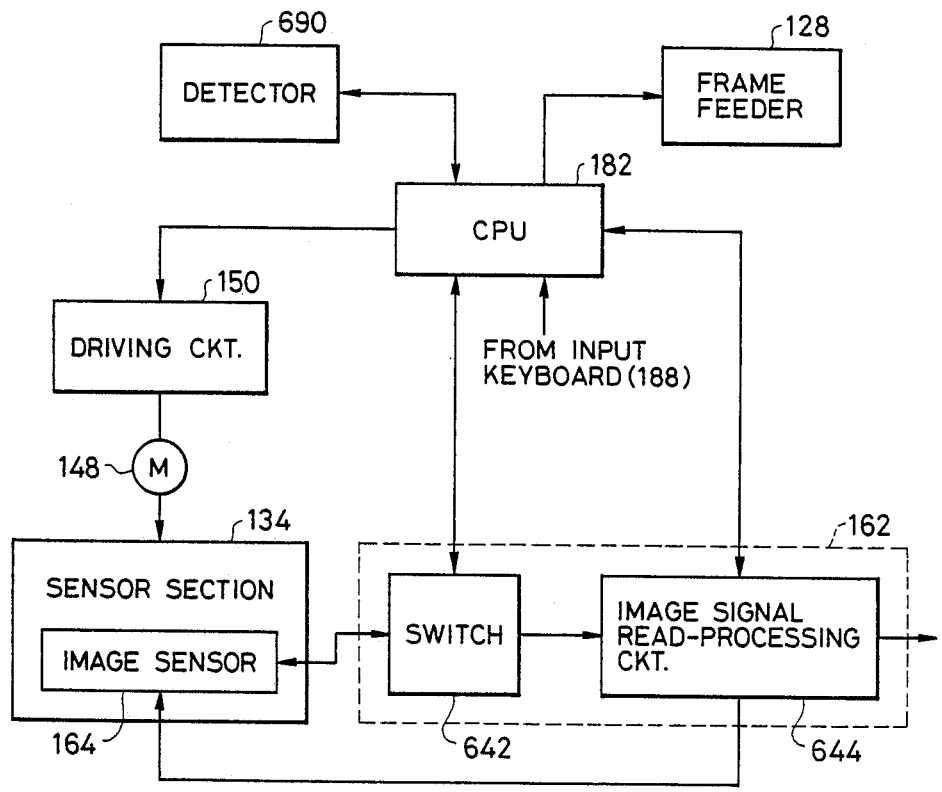
Figure 2:
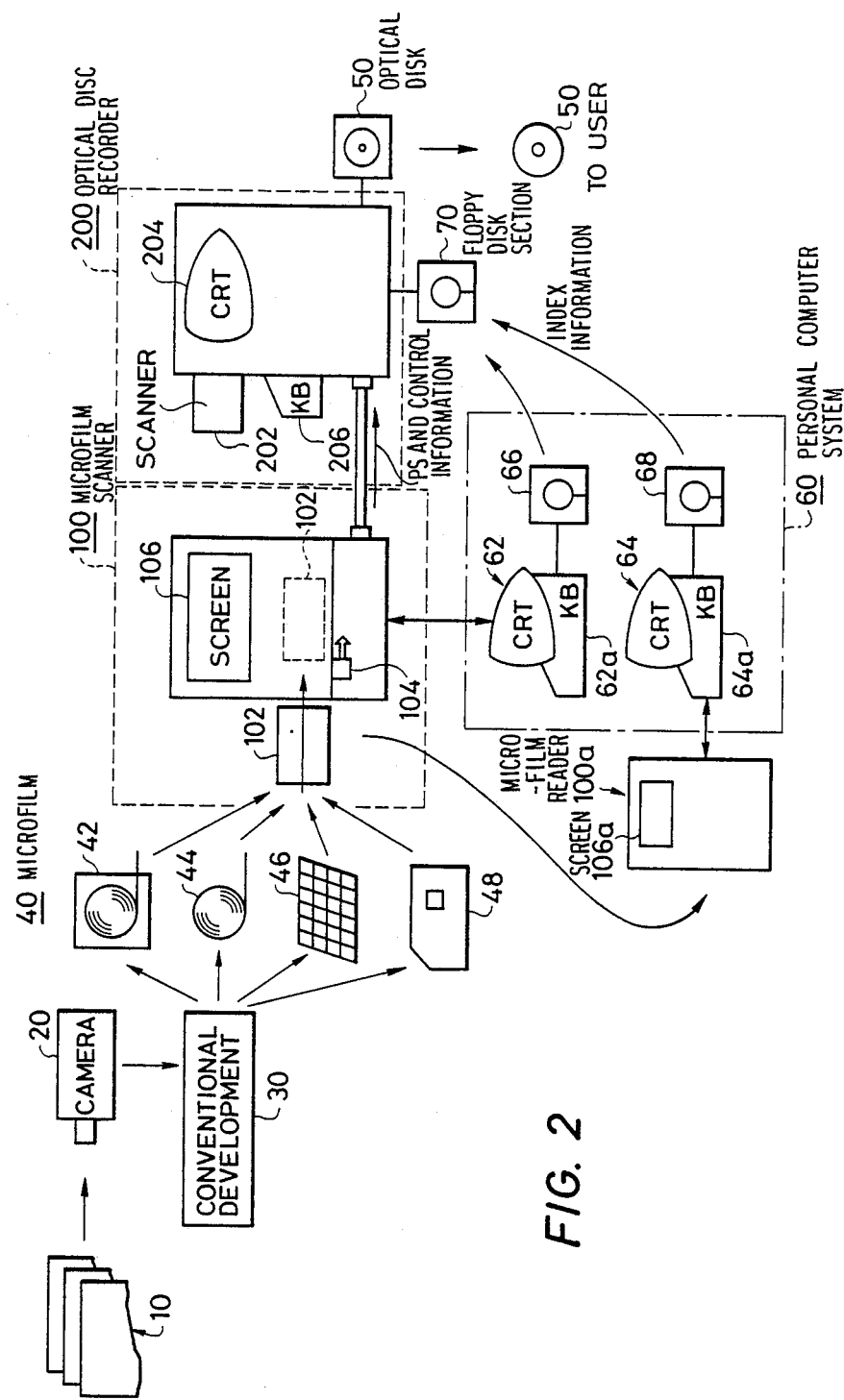
FIG. 2 shows a schematic view of a microfilm reader to which the present invention is applied.

FIG. 1A shows a flow chart for explaining the image reading method. FIG. 1B shows a block diagram indicating a circuit constitution embodying the present invention, and has the same symbols for the same portions of the circuit constitution and that of the conventional microfilm reader described above. The same portions of the circuit constitution shown in FIG. 1B as those of that of the conventional microfilm reader are not described in detail. FIG. 1C shows a flow chart for explaining the operation in the image reading method.

In the image reading method of the present invention, as shown in FIG. 1A, the image sensor 104 is caused to perform auxiliary scanning in a forward direction Y for the image reading start position P to read an image 300. At the end of the auxiliary scanning, the image sensor 104 comes to the auxiliary scanning end position Q. After that, the image sensor 104 is returned in a backward direction Y' as the sensor is caused to perform main scanning in a main scanning direction to measure the reading conditions of next image.

Figure 3:
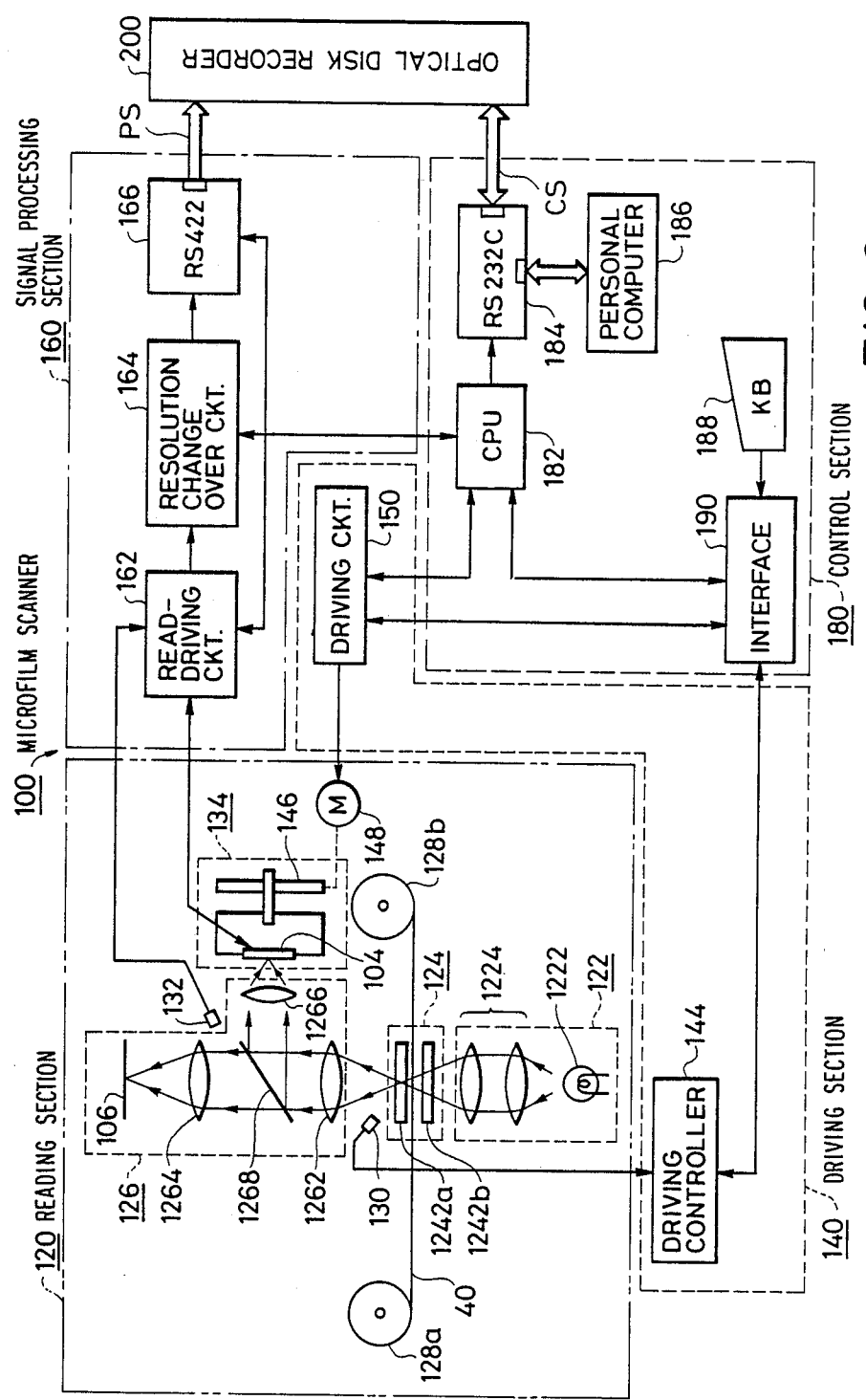
FIG. 3 is a drawing for explaining a microfilm scanner which is a part of the microfilm reader.
Figure 4:
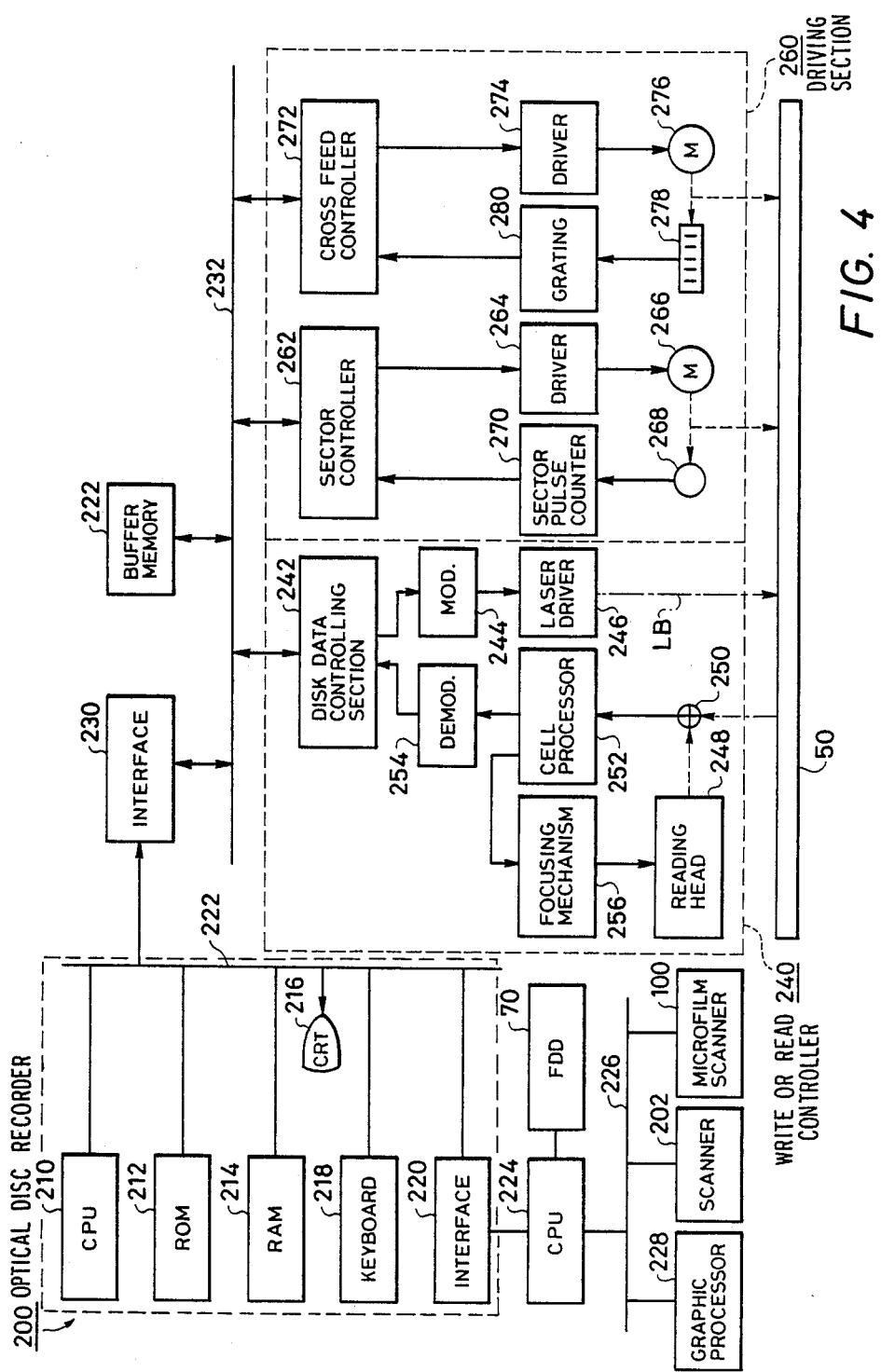
FIG. 4 is a drawing for explaining an optical disk recorder which is another part of the microfilm reader.
Figure 5:
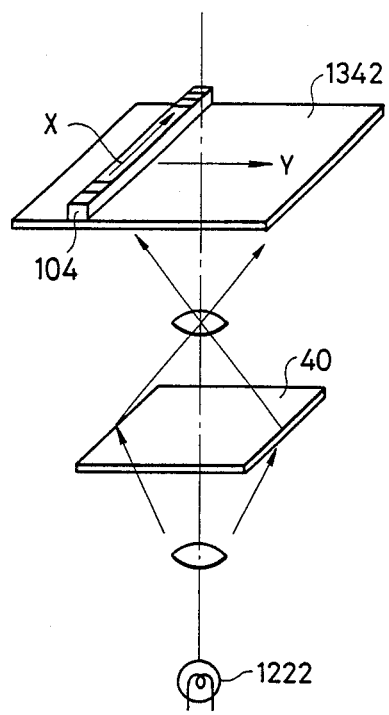
FIGS. 5, 6 and 7 show perspective views for explaining the image reading section of an image signal processor.
Figure 6:
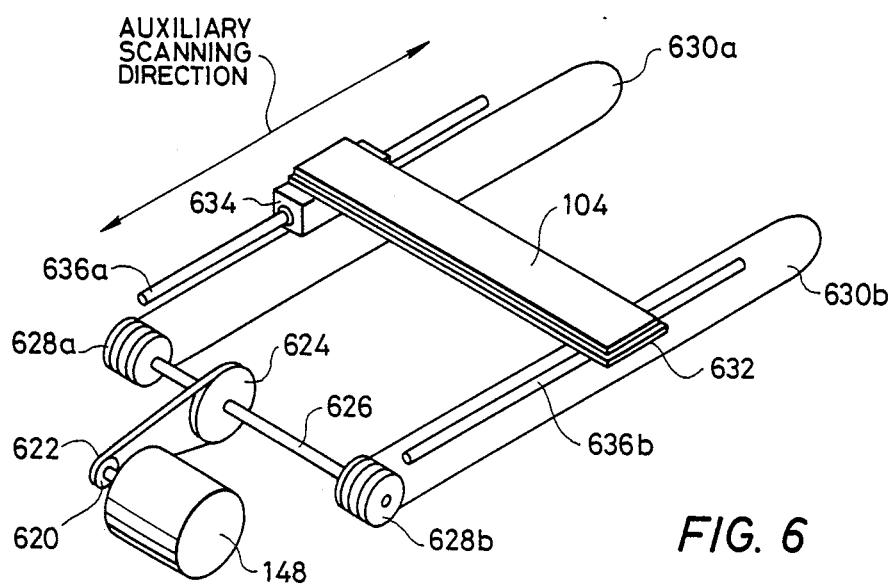
Figure 7:
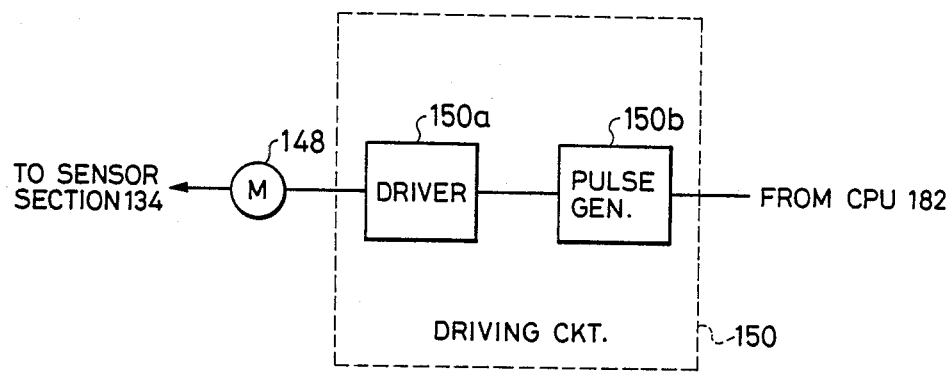
Figure 8:
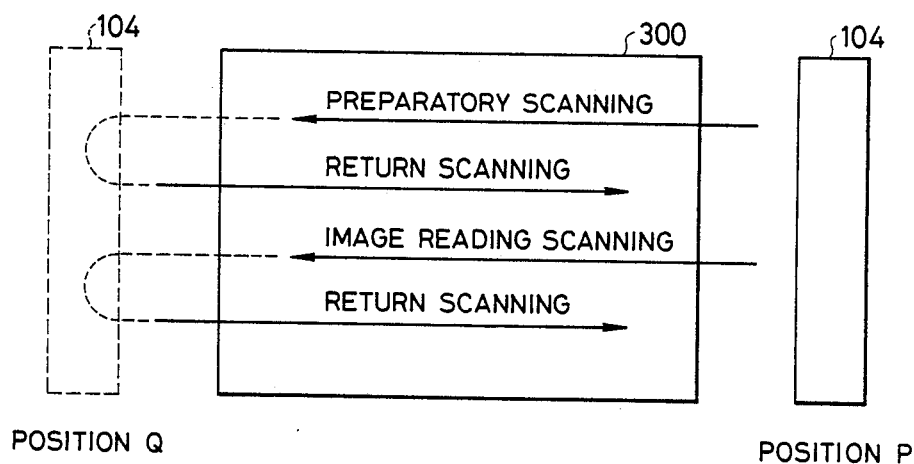
FIG. 8 is a drawing for explaining a conventional image reading method.

Such operation is now described in detail with reference to FIGS. 1A, 1B and 1C. When the image sensor 104 is in the reading start position P and the reading conditions are already measured by preparatory scanning, a start signal is sent from an input keyboard (shown at 188 in FIG. 3) to a CPU 182 to begin the operation in step S1. As shown in FIG. 1B, in step S2, the reading conditions are set in an image signal read-processing circuit 644 of the read-driving circuit 162 by the CPU 182. A switch 642 is set to enable the supply of an image signal from the image sensor 104 to the read-processing circuit 644.

In step S3, a detector 690, a driving circuit 150 and a pulse motor 148 are driven in accordance with an instruction from the CPU 182 to cause a sensor section 134 to start the auxiliary scanning in the forward direction Y. At the same time or at the time of arrival of the image sensor 104 at the area of the image 300, in step S4, the read-driving circuit 162 in accordance with an instruction from the CPU 182 causes the linear sensor 104 to perform the main scanning the main scanning direction. An image signal is thus obtained by the auxiliary scanning and the main scanning and is sent to the read-processing circuit 644 through the switching means 642. In step S5, the image signal is subjected to shading compensation and binary conversion in the read-processing circuit 644 to generate an output signal for processing in a following section.

After the image sensor 104 reaches the auxiliary scanning end position at the end of the auxiliary scanning in step S6, then in step S7, a frame feed control signal is supplied to a frame feeder 128 through the CPU 182 to advance the film and to set and project the image of the next frame of the film. At the same time, a signal indicating the detection of the setting and projection is generated so that, in step S8, a control signal for rotating the motor 148 in reverse is sent to the driving circuit 150 to return the image sensor 104 in the backward direction. In steps S9 and S10, a main scanning start signal is supplied from the CPU 182 to the image sensor 104 through the read-processing circuit 644 to start the main scanning and a switching signal is supplied to the switch 642 to enter a read signal from the image sensor 104 into the CPU 182. In Step S11, the CPU 182 calculates the reading conditions. The result of the calculation is set in the read-processing circuit 644 in step S12. After the image sensor 104 is returned in the backward direction, it is stopped in the scanning start position P so that the preparatory scanning is finished in step S13 and the image sensor stands by to read the next image.

As mentioned above, the reading conditions such as the density of the next image and its range are detected by the backward scanning operation of the image sensor 104 and entered into the CPU 182. The reading conditions are set in the read-processing circuit 644. For that purpose, a table memory or the like may be provided in the CPU 182 so that reading conditions corresponding to the magnitudes or durations (mean values, for example) of signals generated by preparatory scanning are stored in the table memory or the like. A condition value corresponding to such a signal is read from the table memory or the like and set in the read-processing circuit 644 at every preparatory scanning.

A means for generating control signals for performing various kinds of processing may be provided in the CPU 182 to control the input keyboard 188 the detection means 690, the image sensor 104, the driving circuit 150 and the frame feeder 128 in a conventional manner.

After the reading conditions are thus set, a start signal is sent from the keyboard 188 to the CPU 182 to red the next image. As a result, auxiliary scanning is performed in the forward direction to read the next image, and auxiliary scanning as preparatory scanning for the next image is thereafter performed in the backward direction.

Although the present invention is characterized in that the preparatory scanning for reading the next image is performed at the time of the return of the image sensor, a circuit for performing the preparatory scanning is not confined to the embodiment described above, but various other circuits may be provided to embody the present invention. Processing for performing the preparatory scanning may be executed through the use of computer software. Therefore, an optical circuit may be provided depending on design.

A method of causing the image sensor to perform the scanning is not confined to the embodiment described above. A conventional method of causing the sensor to perform the main and auxiliary scanning may be adopted in embodying the present invention.

I claim:
1. An image reading method, comprising:
 a first moving step of moving one-dimensional image sensor over a first image in a first direction from a first position to a second position on opposite sides of said first image to thereby perform auxiliary scanning of said first image;
 during said first moving step, scanning said one-dimensional sensor in a direction non-parallel to said first direction to thereby perform main scanning of said first image;
 then, while said one-dimensional sensor is in said second position, changing said first image to a second image;
 then a second moving step of moving said one-dimensional sensor from said second position to said first position; and
 during said second moving step detecting reading conditions of said second image.

2. An image reading method as recited in claim 1:
 wherein said detecting step is a preliminary scanning of said second image; and
 further comprising;
 a third moving step of moving said one-dimensional sensor from said first position to said second position to thereby perform auxiliary scanning of said second image; and
 during said third moving step, scanning said one-dimensional sensor in said direction non-parallel to said first direction to thereby perform main scanning of said second image.

3. An image reading method as recited in claim 2, further comprising processing data produced by said main scanning of said second image according to said detected reading conditions of said second image.

4. An image reading method as recited in claim 3, wherein said reading conditions include a density and a contrast of said second image.

5. An image reader, comprising a one-dimensional sensor arranged along a first direction;
 means for moving said sensor from a first position to a second position and from said second position to said first position along a direction non-parallel to said first direction;
 means for measuring, by means of one-dimensional sensor, reading conditions of said one image while said moving means moves said one-dimensional sensor from said second to said first position; and
 means for two-dimensionally scanning said one image, by means of said one-dimensional sensor, while said moving means moves said one-dimensional sensor from said first to said second position.

6. An image reader as recited in claim 5, further comprising:
 means for exchanging images disposed between said first and second positions; and
 control means for causing said exchanging means to exchange images while said one-dimensional line sensor is in said second position.

7. An image reader as recited in claim 6, further comprising processor means for processing said one scanned image according to said reading conditions of said one measured image.

* * * * *